United States Patent [19]

Torbus et al.

[11] Patent Number: 4,507,408

[45] Date of Patent: Mar. 26, 1985

[54] BONDING AGENT COLD-HARDENING UNDER THE FORMATION OF POLYURETHANE FOR MOLDED PARTS, ITS MANUFACTURE AND ITS APPLICATION

[75] Inventors: Marek A. Torbus, Duesseldorf; Aleksandar Vujevic, Ratingen, both of Fed. Rep. of Germany

[73] Assignee: Huettenes-Albertus Chemische Werke GmbH, Duesseldorf, Fed. Rep. of Germany

[21] Appl. No.: 538,975

[22] Filed: Oct. 4, 1983

[30] Foreign Application Priority Data

Oct. 6, 1982 [DE] Fed. Rep. of Germany ....... 3237000

[51] Int. Cl.³ ............................................. C08L 75/04
[52] U.S. Cl. .................... 523/143; 524/313; 524/588; 525/453; 525/501; 528/29
[58] Field of Search ............... 523/143; 524/588, 313; 525/504, 480, 453, 501; 528/29, 43

[56] References Cited

U.S. PATENT DOCUMENTS 2,927,910  3/1960  Cooper ............................ 525/480
3,409,579  11/1968  Robins ............................ 523/143
3,980,729  9/1976  Yokokawa et al. ................ 525/480

Primary Examiner—Theodore E. Pertilla
Attorney, Agent, or Firm—Cook, Wetzel & Egan

[57] ABSTRACT

This relates to a bonding agent which is used for the production of molded foundry parts and which is composed of two basic components which harden out cold in the mixture of the molded material in the presence of a catalyst under the formation of polyurethane. One basic component is a polyol in the form of a solution of a co-condensate containing an OH group consisting of phenol, aldehyde and an alkyl phenyl siloxane with a contents of at least 3% by weight in free OH groups, if applicable in mixture with a phenol aldehyde condensate containing an OH group, and the second basic component is a polyisocyanate likewise dissolved under normal conditions. Appropriately the solvent has a content in vegetable oils, preferably castor oil.

7 Claims, 1 Drawing Figure

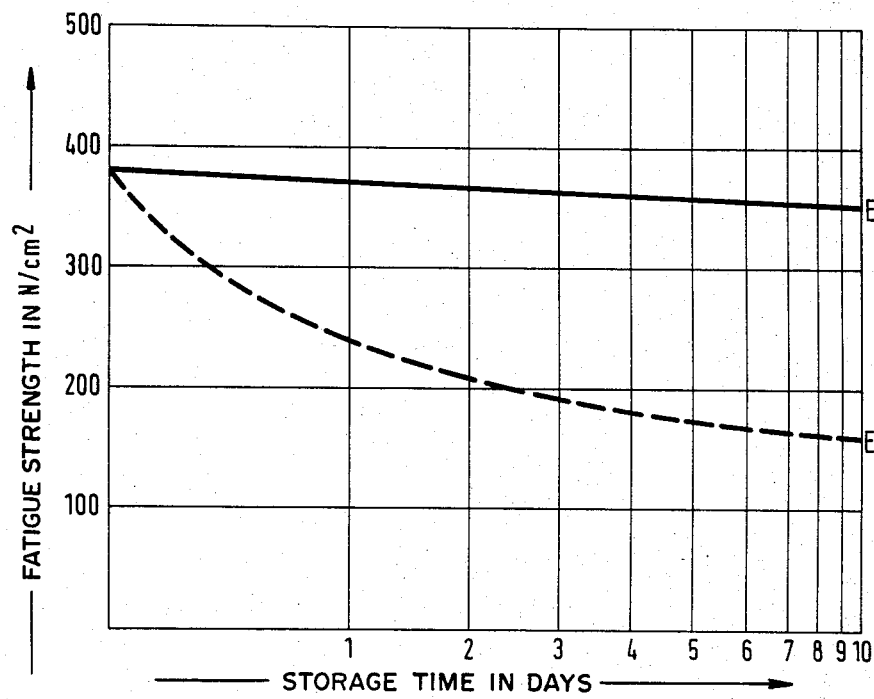

BONDING AGENT COLD-HARDENING UNDER THE FORMATION OF POLYURETHANE FOR MOLDED PARTS, ITS MANUFACTURE AND ITS APPLICATION

In the casting technique the use of water slur has increased dramatically due to ecological and economical reasons; In case of molded parts bound by resins such slurs, however, may lead to problems because many bonding agents react on an influence of humidity with a decrease of the solidity.

This decrease of solidity can be avoided to a large extent in case of hot-hardend molded parts if the water slur is applied to a still hot surface of the molded parts. Then the water evaporates very rapidly and does not penetrate profoundly into the molded part so that the bonding agent is charged only slightly by water and/or water vapor. In case of molded parts which are chilled or cold-hardened from the start, however, the situation is entirely different, for then the water can penetrate deeply into the molded part from the slur; this is true particularly for the water vapor forming during the drying of the slur, and the subsequent drying also lasts a very long time. The result is such a considerable charging of the bonding agent by water and/or water vapor, so that particularly cores and corresponding small molded parts which are penetrated by the water to a large extent, become completely unusable.

Add to this that a considerable group of cold-hardening bonding agents, namely the group of the bonding agents based on polyurethane, is particularly sensitive to humidity. These bonding agents are created in the mixture of the molded material by conversion of a polyol with a poly isocyanate in the presence of a catalyst (tertiary amines or chelate compounds). Thereby polyol is normally a solution of a condensation product from phenols and aldehydes with a low to medium degree of condensation which subsequently, shortly and generally is designated as "phenol resin".

True, attempts already have been made to make the bonding agents on a polyurethane basis more stable against humidity by an addition of oil (silicon oil, mineral oil or castor oil), but only for the purpose of reducing the influence of the atmospheric humidity on the finished molded parts and thus improve their stability. However, such additions of oil are ineffective against the influence of water from water slurs, which influence is stronger by a multiple in comparison with the atmospheric humidity. The method of absorbing the drop of solidity at least partly by increasing the quantity of the bonding agent is contra-indicated, because then other problems (buildup of gas, casting flaws, ecological problems, waste) will occur. Hence, at this time water slurs can hardly be applied in molded parts bound by polyurethane.

The invention is supposed to make available now a cold-hardening bonding agent on a polyurethane basis, which to a large extent is insensitive against humidity and which specifically withstands the high humidity charge by water slurs.

Starting out from a bonding agent whose basic components are a phenol in the form of a solution of a phenol aldehyde condensate containing an OH group (that is of a phenol rsin according to the present definition) and a polyisocyanate, according to the invention this objective is reached in that the phenol aldehyde condensate is replaced wholly or partly by a co-condensate consisting of phenols, aldehydes and a hydroxy functional alkyl phenol siloxane with a content of at least 3% by weight of free OH groups.

The invention is based on the unexpected realization that polyurethane bonding agents where the entire phenol resin or at least part of the phenol resin contains additionally and condensed in an alkyl phenyl siloxane (preferably in a quantity of 0.1 to 5% by weight, related to the final product, show a dramatically increased resistance to water while maintaining their other good properties. Thus, for the first time polyurethane-bound cold hardened molded parts can be produced which can be treated with water slurs without any harmful decrease of solidity. This success of the invention is all the more surprising as neither the mere addition of an alkyl phenyl siloxane containing an OH group to a finished phenol aldehyde condensate nor the application of alkyl phenyl siloxanes without free OH groups will produce any effect. So far it still is unknown on what mechanism of effect the invention is based.

The hydroxy functional alkyl phenyl siloxane appropriate for the purposes of the invention possess the basic building blocks

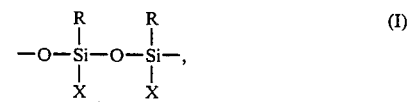

that is in each case the Si atoms are bound via an oxygen atom and carry at least one organic rest. Some of the Si atoms show furthermore free OH groups so that the general formula results

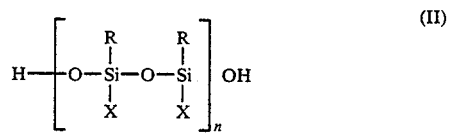

in which n represents an integer of 1 and up

R partly represents an alkyl rest with up to 4 C atoms and for the remainder a phenyl rest, and X represents additional R rests and/or additional basic building blocks (I) and/or OH groups.

These compounds may have linear, ramified and even an annular structure if an annular closing occurs. An example for a simple annular structure is represented by the compound

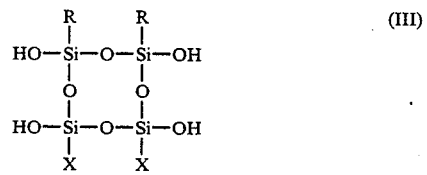

The alkyl phenyl siloxanes according to the general formula (II) are solid meltable substances with a molecular weight of about 300 and up which are soluble in the solutions customary for phenol resins. It is important that their content in free OH groups amounts to at least 3% by weight. Their content in free OH groups preferably is in the range of 4–8% by weight.

The fabrication of a Co-condensate of phenols, aldehydes and a hydroxy functional alkyl phenol siloxane corresponds with the customary production of phenol resin. Merely the condensation reaction is carried out in the presence of an alkyl phenyl siloxane. Phenol or substituted phenols (for example cresols, xylenols and the like, as well as simple aldehydes, particularly formaldehyde are applicable reaction components in the first place. The alkyl phenyl siloxane may be added to the reaction batch in solid form, thereby dissolving in the phenol and then participating in the condensation reaction. Upon completion of the reaction the final product which also can be designated as "siloxane-modified phenol resin" can be dehydrated without any problem.

As it is customary for polyurethane bonding agents, the siloxane-modified phenol resin generally is applied in form of a solution in an organic solvent which, as needed, may be a polar or non-polar solvent or a mixture of both types. Aromatic solvents of the solvent-naphtha type, particularly those with a content of at least 75% in aromatic hydrocarbons and a boiling range of 110° C. to 250° C. are appropriate non-polar solvents. High-boiling ketones and esters, like for example cyclo hexanon, diisopropyl ketone, methyl isoamyl ketone, ethyl amyl ketone, isophoron, acetic acid butyl ester, methyl glycol acetate, linal acetate, butyl cyclo hexyl acetate, trimethyl pentane diol mono isobutyrate, phthalic acid dimethyl etster, phthalic acid diethyl ester, phthalic acid dibutyl ester, phthalic acid dioctyl ester and the like are appropriate polar solvents. Furthermore, additional appropriate polar solvents are the very high-boiling esters with a boiling range of substantially above 200° C./26 mbar. They include for example Bis(2-ethyl hexyl)adipate, dioctyl adipate, didecyl adipate, bis(methyl cyclohexyl)adipate, bis(methyl cyclohexyl methyl)adipate, benzyl octyl adipate, bis(butoxy ethyl)adipate, dihexyl azelainate, tetrakis(2-ethyl hexyl)pyromelliatete, tris(octyl)trimelliatete, bis(2-ethyl hexyl)sebacate, dioctyl sebacate, dihexyl sebacate, as well as esters from alcohol compounds, like Tri-nC$_8$–C$_{10}$ trimellitate and Di-nC$_7$–C$_9$ adipate. It goes without saying that these solvents may be applied in each case either individually or as mixtures.

Further with respect to the idea of the invention the additional surprise was discovered that the water-resistant effect of the bonding agent according to the invention can be improved even further if the solvent also shows a content of a plant oil, particularly castor oil or linseed oil, in fact and preferably in a quantity of 1–10% by weight related to the final product. It seems that the vegetable oil synergetically increases the effect of the bonding agent according to the invention.

The quantity of solvent used shall be sufficient to result in a bonding agent which assures a uniform enveloping of the granules of the basic material of the mold material, a good flowability of the molded material mixture in the initial phase, that is in the filling phase of the mold and core models and a uniform hardening reaction of the mixture of molded material. The amount of solvent appropriate for this amounts to 20 to 80% By weight of the components of the bonding agent.

All polyisocyanates otherwise appropriate for the production of polyurethane resins with at least 2NCO groups may be applied as polyisocyanates in the bonding agent according to the invention, particularly those with aromatic structure. Examples for this are diphenyl methane diisocyanate, phenylene diisocyanate, tetra methyl diphenyl methane diisocyanate, diphenyl dimethyl methane diisociayante, naphthaline diisocyanate, toluene diisocyanate, diphenyl diisocyanate, triphenyl triisocyanate, hexane diisocyanate, cyclo hexyl phenyl methane diisocyanate, xylol diisocyanate, cylo hexane diisocyanate, diphenyl ether diisocyanate or their halogen-substituted derivate. Mixture of various polyisocyanates of identical structure also proved to be very appropriate, for example the phenyl methane diisocyanate raw products available in the trade. Prepolymers of multivalent alcohols with polyisocyanates, providing they contain free isocyanate groups also are applicable.

Appropriately the polyisocyanate component is likewise used in an organic solvent, preferably in aromates, for example of the solvent naphtha type. The concentration of the polyisocyanate thereby is appropriate in the range of 50 to 95% by weight.

The quantity of the polyisocyanate added to the mixture of molded materials should suffice for a polyurethane formation as quantitative as possible, and, depending on the type, it ranges from 50 to 150% by weight of the quantity of the siloxane-modified phenol resin. Thereby the almost stoichiometrical quantities, related to the OH groups and NCO groups are preferred The following examples elucidate the invention. In this connection "GT" in each case stands for parts by weight.

EXAMPLE 1

(prior art)

A batch consisting of 452 grams phenol, 0.2 grams lead naphthenate and 232 grams paraformaldehyde (91%) was condensed in a closed three neck flask which was equipped with an agitator, a thermometer and a reflux cooler, whereby the temperature continuously rose from 95° C. to 120° C. Following vacuum distillation for the removal of the water and the excess phenol and formaldehyde, the resin thusly obtained was diluted with a solvent which contained a mixture of 35 parts by weight solvent naphtha (boiling range 160°–180° C.) and 15 parts by weight butyl phthalate as well as 0.8 parts by weight silane, at a ratio of 1:1.

EXAMPLE 2

(according to the invention)

The procedure was like that of example 1, only the condensation was carried out in the presence of 22 grams of a hydroxy functional methyl phenyl siloxane with a mean molecular weight of about 700 and a content of 6.2% by weight of free OH groups (type 2 6018 of Dow Corning Corporation).

EXAMPLE 3

(according to the invention)

The procedure was like that of example 2, only the solution later received an addition of 5% by weight of castor oil.

Mixtures of molded materials were made from the resins according to examples 1 to 3 which consisted in each case of
  100 parts by weight of sand H 33
  1 part by weight of resin solution, and
  1 part by weight of an 85% solution of diphenyl methyl diisocyanate in solvent naphtha.

These mixtures of molded materials were processed according to DIN 52 401 with a blasting machine into into test bodies (cores) which were hardened by gasification with dimethyl isopropyl amine and then flushed with air. During the subsequent testing of the solidities the values shown in the table below were determined.

In the table the values in the first two columns "mixture processed at once" and "mixture stored for 1 hour" relate to different service lives of the mixtures prior to the addition of the catalyst. In the first case the mixtures were processed immediately after their completion and the cores obtained were tested within 15 seconds (immediately) and/or within 1 hour and 24 hours following the completion of the gasification. In the second case, on the other hand, the mixtures were based on values, whereby the mixtures were stored at first for one hour without the addition of the catalyst, before the cores were shot in a corresponding manner and the values were recorded for the time dependency of the fatigue strength.

TABLE

| | Fatigue Strength in N/cm² | | | | | | | | |
|---|---|---|---|---|---|---|---|---|---|
| | Mixture processed at once | | | Mixture stored 1 hour | | | Cores immersed in water slur and air dried | | |
| Test: | at once | 1 hour | 24 hours | at once | 1 hour | 24 hours | 24 hours | 48 hours | 72 hours |
| Example 1 | 300 | 520 | 600 | 280 | 520 | 580 | 160 | 170 | 170 |
| Example 2 | 300 | 540 | 700 | 300 | 520 | 650 | 520 | 530 | 520 |
| Example 3 | 240 | 540 | 700 | 250 | 540 | 650 | 650 | 650 | 720 |

During a third part of the investigations the procedure was such that the cores (from immediately processed mixtures) were immersed following removal from the blasting machine in a water slur, then air dried and tested subsequently. In that case the first testing only could take place 24 hours following the termination of the gasification.

The table clearly shows that the slurred cores in example 1 (prior art) show a considerable decline of solidity, while in the examples 2 and 3 according to the invention the drop in solidity only is slight. The cores produced with the bonding agent according to the invention thus are markedly more resistant against water.

The success of the invention is illustrated furthermore by another comparative investigation. The drawing shows a comparison of performance of the prior art resin, made according to example 1, with an embodiment of the invention made according to example 3. For that purpose molded body mixtures were made from the resins according to example 1 and example 3 in the above described manner, except by only adding 0.7 parts by weight of resin solution and 0.7 parts by weight of polyisocyanate solution per 100 parts by weight of sand. These molded body mixtures then were processed into cores at once. After reaching their final strength (24 hours) they were stored for different times in an atmosphere of 100% relative atmospheric humidity and then they were tested for their solidities. The values thus found are plotted graphically in the drawing, the X-axis representing storage time in days and the Y-axis representing the fatigue strength in N/cm². The graph illustrates the superiority of the inventive example 3 fatigue strength over the prior art resin during a 10-day period.

We claim:

1. A bonding agent cold-hardening under the formation of polyurethane for the production of molded foundry parts, consisting essentially of a polyol in the form of a solution of a phenol aldehyde condensate containing an OH group and a polyisocyanate, wherein the phenol aldehyde condensate is replaced wholly or partly by a co-condensate consisting of phenols, aldehydes and a hydroxy functional alkyl phenyl siloxane with a content of at least 3% by weight of free OH groups.

2. The bonding agent as defined in claim 1, wherein the polyol is in a solution containing vegetable oils.

3. A method for the production of the bonding agent as defined in claim 1, comprising the step of forming the polyol by condensation of phenols with aldehydes in the presence of 0.1 to 5% by weight, related to the final product, of the hydroxy functional alkyl phenyl siloxane.

4. The method as defined in claim 3 for the production of the bonding agent as defined in claim 2, comprising the additional step of picking up the obtained the co-condensate with a solvent which contains from 1 to 10% by weight, related to the final product, of vegetable oil.

5. A method for the production of molded foundry parts which are treated with a water slur comprising the step of mixing foundry sand with a polyol in the form of a solution of a phenol aldehyde condensate containing an OH group and a polyisocyanate, wherein the phenol aldehyde condensate is replaced wholly or partly by a co-condensate consisting of phenols, aldehydes and a hydroxy functional alkyl phenol siloxane with a content of at least 3% by weight of free OH groups.

6. The bonding agent as defined in claim 1 wherein the vegetable oil is castor oil.

7. The method for the production of a bonding agent of claim 4 wherein the vegetable oil is castor oil.

* * * * *